May 25, 1965   W. J. BOWAN ETAL   3,185,501
ELECTRICAL INSULATING PIPE COUPLING
Filed April 12, 1961   2 Sheets-Sheet 1
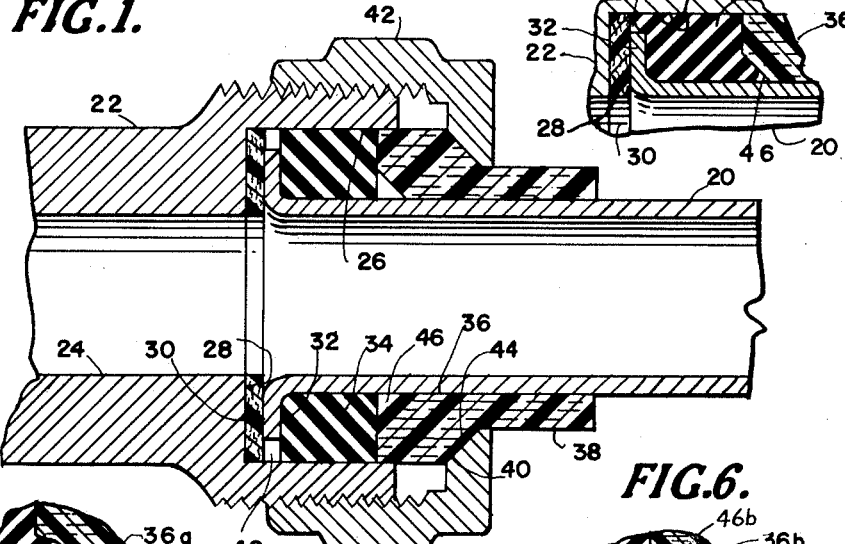
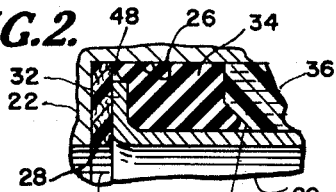
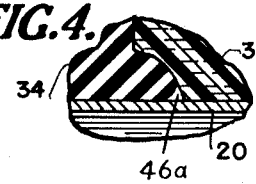
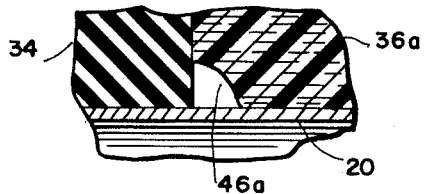
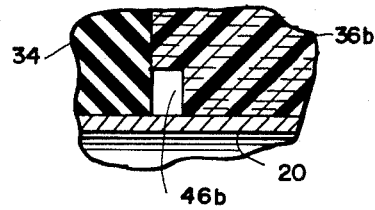
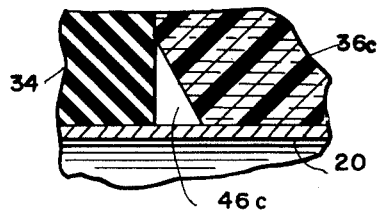
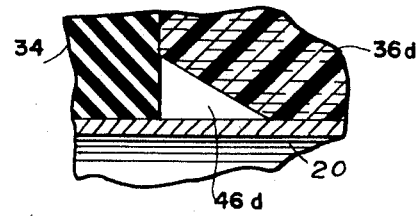
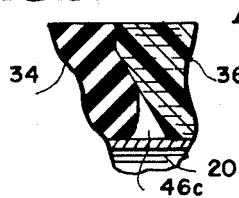
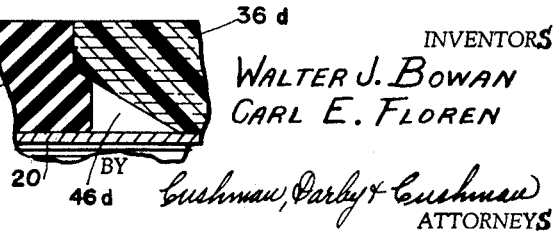
INVENTORS
WALTER J. BOWAN
CARL E. FLOREN
BY Cushman, Darby & Cushman
ATTORNEYS May 25, 1965  W. J. BOWAN ETAL  3,185,501
ELECTRICAL INSULATING PIPE COUPLING
Filed April 12, 1961  2 Sheets-Sheet 2

INVENTORS
WALTER J. BOWAN
CARL E. FLOREN

BY *Cushman, Darby & Cushman*
ATTORNEYS

United States Patent Office 3,185,501
Patented May 25, 1965

3,185,501
ELECTRICAL INSULATING PIPE COUPLING
Walter J. Bowan and Carl E. Floren, Decatur, Ill., assignors to Mueller Co., Decatur, Ill., a corporation of Illinois
Filed Apr. 12, 1961, Ser. No. 102,434
5 Claims. (Cl. 285—52)

This invention relates to electrically insulated pipe joints or couplings and, more particularly, to improvements in electrically insulated pipe joints of the type shown in the patent to Bowan No. 2,950,928.

That patent discloses an insulated pipe joint or coupling of the packed socket type wherein a first of the two tubular metal members to be coupled has a terminal portion provided with an annular packing recess, which terminates at its inner end in an annular shoulder. The second member to be coupled has an exterior circumferential terminal flange of smaller diameter than, and disposed within the recess in the first member, with a washer of electrical insulating material interposed between the flange and the shoulder at the inner end of the recess. A resilient electrically-insulating deformable annular packing gasket snugly embraces the second member and is pushed into the recess against the flange. Compression is exerted on the packing, to effect a tight fluid seal and to make the joint mechanically strong, by a follower of rigid electrically insulating material which extends into the recess behind the packing. The outer portion of the follower is reduced in diameter to provide a flat annular shoulder engaged by a coupling nut that is threaded onto the first member to urge the follower against the packing.

While the joint disclosed in the aforementioned patent possesses the advantages set forth therein, and is satisfactory for its intended purpose, the joint is susceptible of improvements. In particular, the electrically insulating follower of such joint, which frequently is made of a paper base laminate impregnated with a phenolic plastic, is subjected to large axially-directed shearing forces because of the engagement of the coupling nut with less than all of the effective end area of the follower. In other words, the engagement of the coupling nut with the shoulder on the follower creates longitudinal shearing forces therein along a cylindrical intersurface described by axially projecting the circular inner edge of the shoulder. In some instances, as when the coupling nut is tightened unduly, the aforementioned shearing forces result in actually shearing the follower along such cylindrical surface.

Consequently, it is an object of this invention to provide an improved electrically insulated pipe joint or coupling of the type described which minimizes axially-directed shearing forces exerted on a packing follower of electrical insulating material.

The fluid seal effected by a joint of the aforedescribed type depends, to some extent, on the continued maintenance of compression forces on the packing. On the other hand, it is known that resilient packing materials, such as rubber or neoprene, tend to creep and deteriorate with age. Moreover, joints of the type under consideration frequently are subject to wear, due to vibration or other conditions which cause working of the joint. Any such wear which results in diminishing the compression forces on the resilient packing causes a loosening of the joint. Of course, if the joint becomes unduly loose, it not only may leak, but also may possibly fail mechanically because of undue loosening of the coupling nut.

Accordingly, it is another object of this invention to provide an improved electrically insulated pipe joint of the type under consideration with means for ensuring the maintenance of compression forces on the packing.

Other objects and advantages of the invention will become apparent from the following description and accompanying drawings in which:

FIGURE 1 is a longitudinal fragmentary sectional view of an electrically insulated pipe joint embodying this invention. The joint is illustrated in its initially assembled condition and before being tightened.

FIGURE 2 is a fragmentary view of a portion of FIGURE 1 illustrating the condition of the joint after being tightened.

FIGURE 3 is an enlarged fragmentary sectional view corresponding to a portion of FIGURE 1, but illustrating a first modified form of the invention.

FIGURE 4 is a fragmentary view of a portion of FIGURE 3 illustrating the condition of the joint after being tightened.

FIGURES 5 and 6, 7 and 8, and 9 and 10 are pairs of 3 and 4 but illustrating second, third, and fourth modified forms of the invention.

Figure 11:
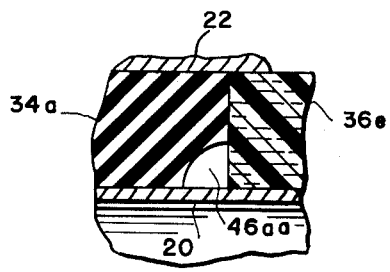
Figure 13:
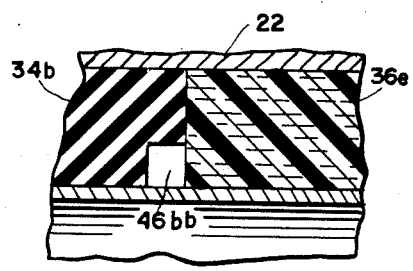
Figure 12:
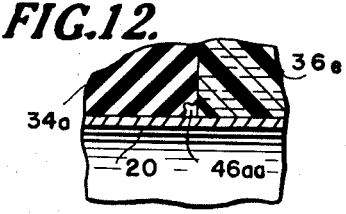
Figure 14:
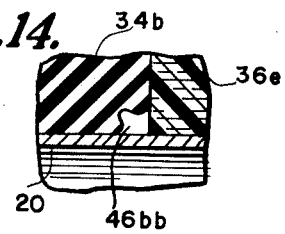
Figure 15:
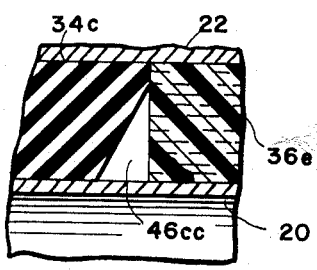
Figure 17:
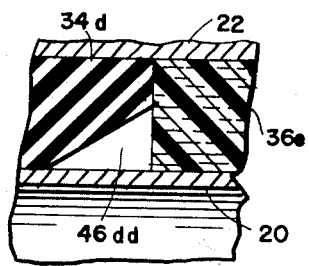
Figure 16:
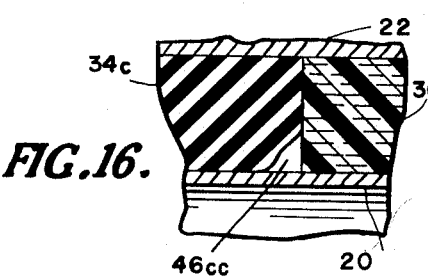
Figure 18:
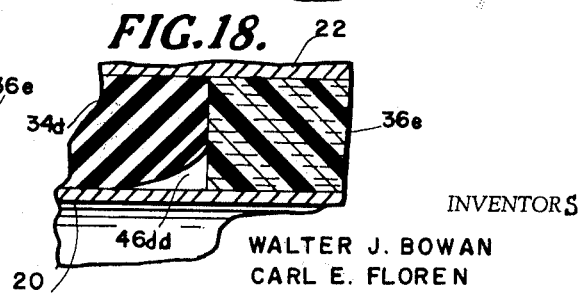

FIGURES 11 and 12, 13 and 14, 15 and 16, and 17 and 18 are pairs of views corresponding to FIGURES 3 and 4, 5 and 6, 7 and 8, and 9 and 10, respectively, but illustrating four more modified forms of the invention.

Referring now to FIGURE 1 of the drawings there is shown therein an electrically insulated pipe joint embodying this invention as a typical example of its application, the joint is illustrated as connecting a relatively thin-walled pipe or tube 20, of copper or the like with a terminal or connecting end portion 22 of a tubular or hollow member, such as a pipe, a valve, or other fifitting, of a dissimilar metal, e.g. steel or cast iron. The outer end of the flow passage 24 of the terminal portion 22 is counterbored to provide an annular cylindrical packing recess 26 which terminates at its inner end in a flat annular shoulder 28. Disposed within the recess 26 in engagement with the shoulder 28, and substantially coextensive therewith, is a flat washer 30 of relatively rigid, electrical insulating material, such as glass-filled melamine formaldehyde or laminated Fiberglas, i.e, glass fibers impregnated with a polyester resin, for example, styrene modified ethylene glycolmaleic anhydride type alkyd, or the like.

At its terminal end the copper pipe or tube 20 is flared outwardly to provide a substantially flat circumferential flange 32 of smaller diameter than the recess 26. The flange 32 abuts and is retained against the outer face of the washer 30 by an annular resilient, deformable packing gasket 34 of electrical insulating material, such as natural or synthetic rubber or the like, e.g., butadiene styrene and butadiene-acrylonitrile. The interior surface of the gasket 34 is generally cylindrical and of a diameter substantially equal to the outer diameter of the pipe 20 so as to snugly embrace the latter. The exterior surface of the gasket 34 also is generally cylindrical and of a diameter only slightly smaller than that of the recess 26 so as to snugly fit therein. In the embodiments shown in FIGURES 1–10, the outer end of the packing gasket 34, when relaxed as shown in FIGURES 1, 3, 5, 7, and 9, terminates in a flat end surface, while the inner end of the gasket may likewise terminate in a flat end surface, both end surfaces being substantially normal to the axis of the joint. While it might be thought to be desirable to provide the inner end of the gasket 34 with a skirt-like extension (not shown) of reduced radial thickness to fit, when relaxed, in the annular space between the periphery of the flange 32 and the cylindrical sidewall of the recess 26, it has been found in actual practice that such a skirt-like extension is unnecessary because after the joint is tightened the packing gasket 34 and the follower 36, described in detail hereinafter, center the pipe 20 in the recess 26 with sufficient rigidity to maintain the periphery of the flange 32 out of contact with the cylindrical sidewall of the recess.

Bearing against the outer end face of the packing gasket 34 is the rigid annular sleeve-like follower 36 of electrical insulating material, preferably material which is highly resistant to moisture absorption. While the follower 36 may be made solely of a high strength plastic, e.g. a phenolic plastic, such as phenol-formaldehyde or phenol-furfural, a partciularly appropriate material for the follower is a paper base laminate impregnated with a phenolic plastic. The laminations usually are formed by wrappings which create substantially cylindrical coaxial cleavage interfaces extending the length of the follower 36. The interior and exterior surfaces of the follower 36 are generally cylindrical and of diameters respectively to snugly fit the exterior of the pipe 20. The sum of the axial dimensions of the washer 30, the flange 32, and the packing 34, is less than the corresponding dimension of the recess 26, so that the follower 36, when the joint is assembled, will extend partially into the recess against the outer end of the packing.

Outwardly beyond the end of the terminal portion 22 the follower 36 is exteriorly reduced in diameter and provided with an extension 38 which forms an outwardly-facing exterior shoulder 40. Preferably, for reasons later described, the shoulder 40 is of conical configuration and inclined at an angle of about 45°.

A metal coupling nut 42, preferably of the same metal or the terminal portion 23, is engaged with exterior threads on the terminal portion and has an inwardly extending circumferential flange provided with a conical surface 44 complementary to and for engagement with the conical surface of the shoulder 40 in order to urge the follower 36 against the packing gasket 34 on tightening of the coupling nut. Obviously the nut 42 could be replaced with an equivalent follower-forcing arrangement, such as a bolted-yoke mechanism (not shown). The follower extension 38 not only preserves the electrical insulating characteristics of the joint by minimizing the possibility of electrical bridging between the pipe 20 and the nut 42, but also strengthens and prevents bending of that portion of the pipe which is immediately outward of the coupling nut. Additionally, it will be seen that such extension 38 inhibits working of the inner end of the pipe 20 within the recess 26, i.e., tilting of such inner end relative to the axis of the terminal portion 22.

For reasons later described, the inner end of the follower 36 is provided with an annular recess 46 at the inner edge of its otherwise flat annular end face. In the embodiment shown in FIGURES 1 and 2 of the drawings the recess 46 may be formed by bevelling the inner edge of the end face at a substantially 45° angle, so that the recess is substantially in the shape of an isosceles triangle in radial section. Preferably, the major radial dimension of the recess 46 is at least as large as, and desirably of the order of, the major radial dimension of the reduced extension 38 on the follower 36.

After the joint is made up as shown in FIGURE 1, i.e., after the washer 30 has been positioned against the shoulder 28, the flange 32 against the washer, the packing 34 against the flange, and the follower 36 against the packing, the coupling nut 42 is engaged with the threads on the terminal portions 22 and tightened so as to forcefully push the follower against the packing. Such compression of the packing 34 will, of course, tend to expand the same radially outwardly against the cylindrical sidewall of the recess 26 and inwardly against the outer surface of the pipe 20 to thereby effect tight fluid seals. Moreover, the compression of the packing gasket 34 between the follower 36 and the outer side of the flange 32 will make the joint mechanically rigid.

Additionally, it will be seen that the inclination of the interengaging surfaces 40 and 42 between the coupling nut 42 and the follower 36 tends to create an inwardly directed component in the force exerted by the nut on the follower. In other words the inclination of the surfaces 40 and 44 changes the direction of the force exerted by the nut 42 somewhat away from pure axial shear. Thus, the construction somewhat reduces the axial shearing forces on the follower 36 along a cylindrical intersurface of cleavage therein coaxial with the exterior surface of the reduced extension 38. It also will be seen that because of the annular recess 46 in the inner end of the follower 36 the packing 34 does not exert a longitudinal reaction force against an annular effective end area on the follower substantially coextensive with such recess. As a result, the aforementioned shearing forces are reduced even more, so as to minimize any possible shearing of the follower 36 along the aforementioned cylindrical intersurface therein.

Since the material of the packing 34 is substantially incompressible, forcing the follower 36 against the same causes the packing to be deformed and to bulge both into the annular recess 46 in the inner end of the follower 36 and into the annular space 48 between the periphery of the flange 32 and the side wall of the recess 26 as shown in FIGURE 2. The packing 34, however, even though deformed so as to bulge into the aforementioned annular spaces, constantly tends to resume its original flat-end configuration, when relaxed. Thus, the deformation of the packing 34 tends to maintain compression in the joint even though the packing becomes worn somewhat by vibration or other working of the joint. It also will be seen that the bulging of the packing 34 into the annular space 48 between the periphery of the flange 32 and the side wall of the recess 26, as shown in FIGURE 2, effectively electrically insulates these potential areas of contact.

Although the recess 46 in the inner end of the follower 36 has been shown in FIGURES 1 and 2 as having a configuration, in radial section, substantially the same as an isosceles triangle, such configuration is not absolutely necessary in order to achieve the improved results of this invention. For example, a follower 36a may have a recess 46 provided with a concavely curved sloping wall as shown in FIGURES 3 and 4, a follower 36b may have a recess 46b that is substantially rectangular in radial section, as shown in FIGURES 5 and 6, a follower 46c may have a recess 46c that is triangular with a 60° angle of inclination, as shown in FIGURES 7 and 8, or a follower 36d may have a triangular recess 46d that has only a 30° angle of inclination, as shown in FIGURES 9 and 10.

It also has been determined that the benefits of the invention attributable to the recess 46 in the inner end of the follower 36 may be accomplished with substantially the same effectiveness by making the recess in the outer end of the gasket 34, instead of in the inner end of the follower and providing the latter with a plain uninterrupted flat end. Thus, for example, FIGURES 11, 13, 15 and 17, illustrate gasket recess configurations 46aa, 46bb, 46cc, and 46dd corresponding to the follower recess 46a, 46b, 46c, and 46d configurations shown in FIGURES 3, 5, 7 and 9, respectively. Because of the nature of the materials involved, however, it usually will be found simpler and cheaper to form the recess in the inner end of the follower rather than in the outer end of the packing gasket.

The primary requirements of a recess between the packing 34 and follower 36 are that radially outwardly of such recess the inner end of the follower should have a flat annular end surface at least as large as, and preferably substantially coextensive with, the axial projection of the conical shoulder 40, so as to accomplish the afore-described minimization of shearing forces in the follower. Additionally, although not clearly illustrated by the drawing proportions, the recess between the opposed ends of the gasket 34 and the follower 36 should provide a somewhat larger volume into which the packing gasket may bulge than is provided by the annular space 48 between the periphery of the flange 32 and the side wall of the recess 26. In all other respects the joint possesses the advantageous characteristics of the joint disclosed in the aforementioned Bowan patent.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

We claim:

1. In a pipe joint, the combination comprising: a hollow metal body having a terminal portion provided with an annular packing recess terminating at its inner end in an annular shoulder surrounding a concentric flow passage, the sidewall of said recess being substantially cylindrical; a relatively-thin substantially-rigid washer of electrical insulating material adapted to be disposed in said recess in engagement with said shoulder to form an abutment for a circumferential flange, of smaller diameter than said recess, on the terminal end of a metal pipe adapted to extend into said recess for coupling to said body; a resilient deformable annular gasket member of electrical insulating material adapted to be disposed in said recess, said gasket member having an inner annular end surface adapted to engage the outer face of the pipe flange, an outer annular end surface, an interior substantially cylindrical surface adapted to snugly embrace the pipe, and an exterior substantially cylindrical surface adapted to engage said recess sidewall; a substantially rigid annular follower member of electrical insulating material having a substantially cylindrical exterior surface of slightly smaller diameter than said recess, a substantially cylindrical interior surface adapted to closely fit the pipe, an inner annular end surface, and an exteriorly reduced outer substantially cylindrical extension forming an outwardly-facing frusto-conical annular shoulder, said follower member being adapted to extend into said recess into compressing engagement with said gasket member, the inner edge of at least one of the opposed annular end surfaces of said members having a concentric annular recess therein having a major radial dimension at least of the order of the radial thickness of said extension so as to provide at least one annular area between said opposed surfaces where the latter will be out of contact with each other before said gasket member is compressed by said follower and a contact area between the remaining portions of said opposed surfaces which is substantially co-extensive with the axial projection of said frusto-conical shoulder; and urging means engaged with said body, said urging means having a frusto-conical surface engaging said frusto-conical shoulder for urging said follower member against said gasket member whereby axial shearing forces on said follower member are reduced.

2. The structure defined in claim 1 wherein the inter-engaged frusto-conical surfaces between the shoulder and the urging means have a projected apex outwardly of said shoulder and a conical angle of the order of 45°.

3. The structure defined in claim 1 wherein the concentric annular recess is formed in the follower member.

4. The structure defined in claim 1 wherein the concentric annular recess is formed in the gasket member.

5. The structure defined in claim 3 wherein the inter-engaged frusto-conical surfaces between the shoulder and the urging means have a projected apex outwardly of said shoulder.

References Cited by the Examiner

UNITED STATES PATENTS

| 755,994 | 3/04 | Broome | 285—350 |
|---|---|---|---|
| 1,869,915 | 8/32 | Sample. | |
| 2,174,299 | 9/39 | Whitney | 285—348 |
| 2,759,743 | 8/56 | Bloom | 285—350 |
| 2,735,700 | 2/58 | Bowan | 285—350 |
| 2,867,463 | 1/59 | Snider | 285—52 |
| 2,950,928 | 8/60 | Bowan | 285—354 |

FOREIGN PATENTS

| 42,519 | 5/33 | France. |
| 809,441 | 12/34 | France. |
| 364,375 | 1/32 | Great Britain. |
| 779,959 | 7/57 | Great Britain. |

CARL W. TOMLIN, *Primary Examiner.*